Oct. 27, 1931.  G. L. SMITH  1,828,851

FLAG HOLDER

Filed June 26, 1929

Inventor:
George L. Smith
by Charles E. Gooding.
Atty.

Patented Oct. 27, 1931

1,828,851

UNITED STATES PATENT OFFICE

GEORGE L. SMITH, OF HYDE PARK, MASSACHUSETTS

FLAG HOLDER

Application filed June 26, 1929. Serial No. 373,745.

This invention relates to a flag holder, and has for its object to provide a holder which may be secured to the front of the radiator of an automobile for the purpose of supporting a group of small flags thereon.

Another object of the invention is to provide a flag holder which may be constructed at a minimum cost from a single piece of resilient sheet metal, portions of which may be flexed, if necessary, to secure the holder to the radiator of an automobile and also to clamp the flags in the holder.

The invention consists in a flag holder as set forth in the following specification and particularly as pointed out in the claims thereof.

Referring to the drawings.

Like numerals refer to like parts throughout the several views of the drawings.

Figure 1:
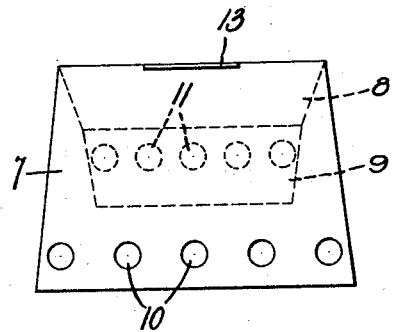
Figure 1 is a plan view of a flag holder embodying my invention.
Figure 3:
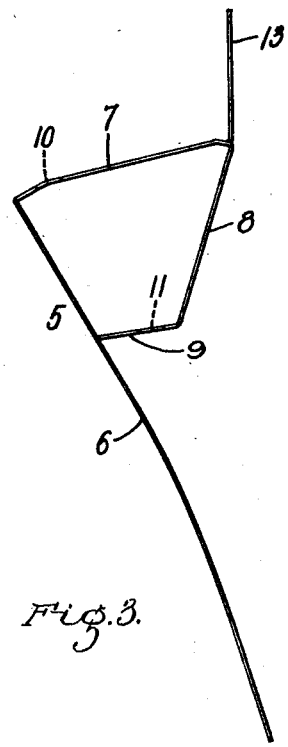
Fig. 3 is a side elevation of the holder as viewed from the right hand side of Fig. 2.
Figure 4:
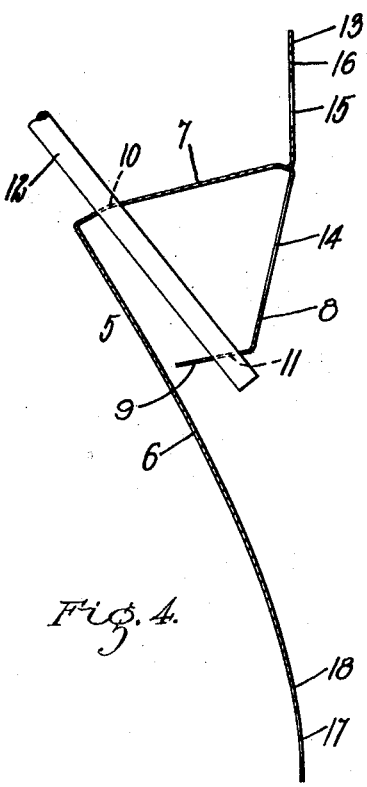
Fig. 4 is a central vertical section taken on the line 4—4 of Fig. 2 looking in the direction of the arrows on said line, a flag staff being illustrated clamped in the holder.
Figure 2:
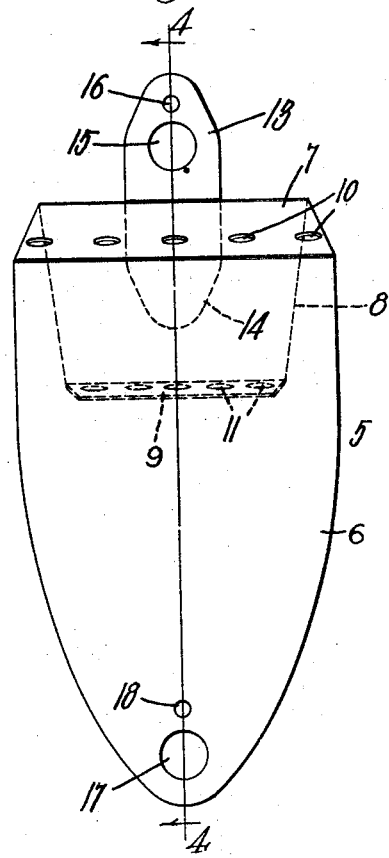
Fig. 2 is a front elevation of the flag holder.

In the drawings, 5 represents a holder constructed of a single piece of resilient sheet metal and embodying therein a forwardly and upwardly inclined front portion 6, a rearwardly and upwardly inclined top portion 7, a rear portion 8 and a bottom portion 9 which is oppositely disposed to the top portion 7 and also spaced apart therefrom. A series of holes 10 is provided in the top portion 7 and another series of holes 11 is provided in the bottom portion 9, and all of said holes are so spaced that when the flag staffs 12 are inserted in the corresponding holes of both the top portion 7 and bottom portion 9, that each flag will be inclined forwardly with relation to the front of the member to which the holder is secured and also positioned at different angles to each other.

A lip portion 13 is stamped from the metal of the rear portion 8, thereby leaving a hole 14 in said rear portion and said lip is bent upwardly from the rear edge of the top portion 7 and has holes 15 and 16 formed therein. Other holes 17 and 18 are provided adjacent to the bottom of the front portion 6 and all of said holes are provided for the purpose of receiving various types of fastening devices which may be employed in securing the holder to the front of an automobile radiator.

In mounting the flags in the holder 5, the staffs 12 of said flags are first inserted through the holes 10 in the top portion 7 of the holder, and said staffs are pushed downwardly through said holes and into and through the corresponding holes 11 that are provided in the bottom portion 9 of the holder, and in inserting the staffs 12 through the holes 11 both the rear portion 8 and bottom portion 9 of the holder may be flexed in order that the staff may be inserted through the holes 11, after which upon releasing the portions 8 and 9, the latter portion will spring into engagement with the lower portion of the staff and firmly clamp the same in position in the bottom portion 9.

It will be noted that the front portion 6 of the holder is bowed rearwardly slightly and if it so happens that the various holes 15, 16, 17 and 18 do not properly align with the spaces of the radiator or it is difficult to insert the fastening means that are employed for securing the holder to the radiator through the spaces therein, the front portion of the holder may be flexed a sufficient amount so that the fastening means may be readily inserted through the spaces of the radiator.

It will be evident that as the holder of this invention is constructed of resilient sheet metal, that the top portion 7, the rear portion 8 and the bottom portion 9 all co-operate in holding the flag staff and may be flexed either individually or collectively as desired in order that the flag staff may be held securely therein.

I claim:—

1. A flag holder constructed of a single piece of sheet material and embodying therein a forwardly inclined resilient front portion provided with a hole therein to receive a fastening device, a rearwardly inclined top portion provided with a series of holes therein, a lip extending upwardly from said top portion and provided with a hole therein to receive a fastening device, and a resilient bottom portion oppositely disposed to said top portion and also provided with a series of holes therein, said bottom portion being adapted to be flexed to permit a flag staff projecting downwardly from a hole in the top portion to be inserted in a hole in the bottom portion, and finally gripping the staff and clamping the latter in said last-named hole, and the front portion being adapted to be flexed to vary the distance between the holes provided for the fastening devices.

2. A flag holder having, in combination, a forwardly inclined front portion provided with a hole therein to receive a fastening device, a top portion projecting rearwardly from the top of said front portion and provided with a series of holes therein, a rear portion at the rear of said top portion and provided with a hole therein to receive a fastening device and a bottom portion projecting forwardly from the bottom of said rear portion and also provided with a series of holes therein, said bottom portion being adapted to be flexed to permit a flag staff projecting downwardly from a hole in the top portion to be inserted in a hole in the bottom portion, and finally gripping the staff and clamping the latter in said last-named hole, and the front portion being adapted to be flexed to vary the distance between the holes provided for the fastening device.

3. A flag holder having, in combination, a forwardly inclined resilient front portion provided with a hole therein to receive a fastening device, a top portion projecting rearwardly from the top of said front portion and provided with a series of holes therein, a lip extending upwardly from the rear of said top portion and provided with a hole therein to receive a fastening device, a rear portion projecting downwardly from the rear of said top portion and a bottom portion projecting forwardly from the bottom of said rear portion and also provided with a series of holes therein, the bottom portion being adapted to be flexed to permit a flag staff projecting downwardly from a hole in the top portion to be inserted in a hole in the bottom portion, and finally gripping the staff and clamping the latter in said last-named hole, and the front portion being adapted to be flexed to vary the distance between the holes provided for the fastening devices.

In testimony whereof I have hereunto set my hand.

GEORGE L. SMITH.